US007869946B2

(12) United States Patent
Couckuyt et al.

(10) Patent No.: US 7,869,946 B2
(45) Date of Patent: Jan. 11, 2011

(54) EFFICIENT NAVIGATION ROUTING SYSTEM AND METHOD

(75) Inventors: Jeffrey Darren Couckuyt, Bothell, WA (US); Duncan Murray Lawler, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1398 days.

(21) Appl. No.: 11/050,987

(22) Filed: Feb. 4, 2005

(65) Prior Publication Data

US 2006/0178819 A1 Aug. 10, 2006

(51) Int. Cl.
*G01C 21/30* (2006.01)
*G01C 21/32* (2006.01)
*G01C 21/00* (2006.01)

(52) U.S. Cl. ............... 701/209; 701/201; 701/202; 701/205; 701/207; 701/208

(58) Field of Classification Search ............... 701/53, 701/54, 62; 477/97, 107, 110, 111
See application file for complete search history.

(56) References Cited

U.S. PATENT DOCUMENTS

| | | | | |
|---|---|---|---|---|
| 5,119,317 A | * | 6/1992 | Narikawa et al. ............... 703/1 |
| 5,285,391 A | * | 2/1994 | Smith et al. ............... 701/200 |
| 5,878,368 A | | 3/1999 | DeGraaf | |
| 6,708,112 B1 | * | 3/2004 | Beesley et al. ............... 701/209 |
| 7,248,184 B2 | * | 7/2007 | Gelhar et al. ............... 340/990 |
| 2002/0128768 A1 | * | 9/2002 | Nakano et al. ............... 701/202 |
| 2005/0102101 A1 | * | 5/2005 | Beesley et al. ............... 701/209 |

OTHER PUBLICATIONS

Eklund, Peter W., et al., "A Dynamic Multi-Source Dijkstra's Algorithm for Vehicle Routing," Department of Computer Science, University of Adelaide, South Australia, 1996.

* cited by examiner

*Primary Examiner*—Khoi Tran
*Assistant Examiner*—Nicholas Kiswanto
(74) *Attorney, Agent, or Firm*—Merchant & Gould

(57) ABSTRACT

A routing system for efficiently determining a route between an origin and destination is provided. The routing system operates on route data that is organized into rectangular grids. The route data includes edges with their costs, and nodes that identify connecting edges. The route data is also organized according to a hierarchy, with higher level grids corresponding to at least one lower level grid. The lowest level grids contain all route data corresponding to the area covered by each low level grid. The higher level grids contain a copy of route data from their corresponding lower level grids for only those routes that are identified as important routes. A routing algorithm uses the hierarchy in a manner such that higher level grids are used whenever practical to efficiently find a route from the origin to the destination.

14 Claims, 12 Drawing Sheets

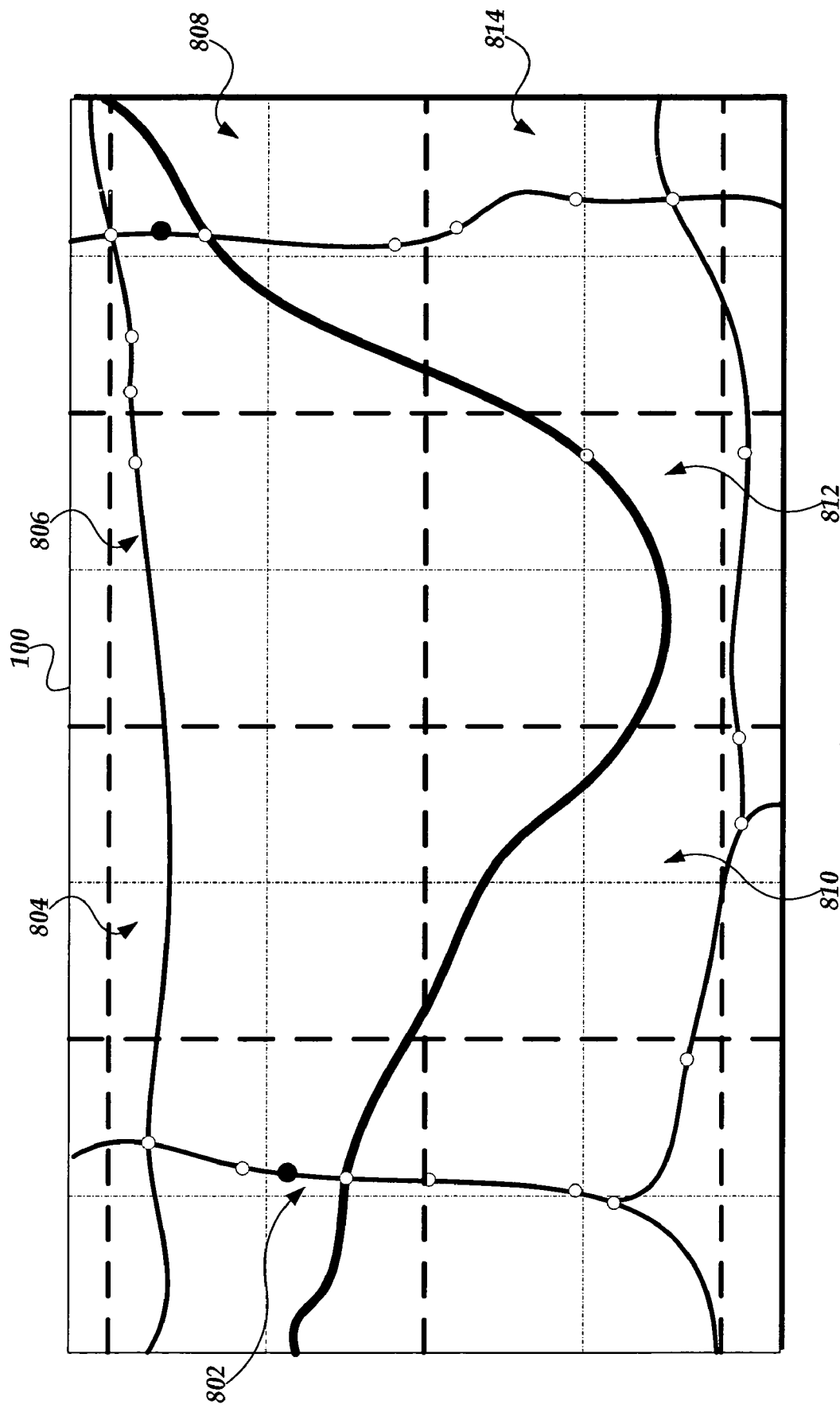

EFFICIENT NAVIGATION ROUTING SYSTEM AND METHOD

FIELD OF THE INVENTION

The present invention relates to navigation routing, and more particularly, to a system and method for providing navigation routing on a variety of computing devices.

BACKGROUND OF THE INVENTION

With the ever increasing presence of computing devices, and positioning devices, such as global positioning systems (GPSs), as well as electronic information regarding streets, routes, schedules, traffic conditions, and the like, determining an efficient route from one point to another is becoming an important area of focus. Indeed, given a map, such as map 100 on FIG. 1, with a variety of routes between origin Point A 102 and destination Point B 104, many drivers would like to know which is the "best" route to take. Of course, the "best" route may involve a variety of factors, such as shortest distance, least amount of travel time, least congested route, most scenic route, and the like. However, if what it means to select the "best" could be specified, it would be important and useful to be able to determine such routes.

As those skilled in the art will appreciate, a basic algorithm, called Dijkstra's Algorithm, formulated by Edsger W. Dijkstra, serves, at least in part, as a foundation for nearly all vehicle routing algorithms. An explanation of Dijkstra's Algorithm, sometimes referred to as a double bucket algorithm, may be found at the following Internet location: http://www.kvocentral.com/kvopapers/pollitt.pdf. In order to determine the best solution between two points, the routes are identified according to nodes and edges. For example, with reference to FIG. 2 which illustrates the exemplary map 100 of FIG. 1, exemplary nodes would include 202, 204, and 206. Edges are segments between two nodes, such as edge 208, 210, and 212. Each edge is associated with a cost, based on some evaluation or determination. For example, assuming the cost is to be determined in the amount of time it takes to traverse the route, each edge (a segment of a route between two nodes) is associated with its cost, i.e., the amount of time it takes to traverse that segment. As shown in FIG. 2, the map 100 further illustrates the cost of each edge, as indicated by the numbers within the map 100. Simply stated, Dijkstra's Algorithm sums up the costs of all edges on every route, and selects the route that resulted in the lowest cost that reaches the destination.

While Dijkstra's Algorithm will find the shortest route between two points according to the costs associated with each edge, one of the problems of the algorithm is that it finds all solutions between two points. In fact, it tends to find all solutions between an origin and any other location. FIG. 3 is a pictorial diagram illustrating how a basic implementation of Dijkstra's Algorithm between Point A 102 and Point B 104 begins at Point A and extends out in each direction, as indicated by the concentric rings. As FIG. 3 suggests, Dijkstra's algorithm even evaluates solutions that do not ultimately reach Point B 104, and even go in an opposite direction from Point B. Clearly, such comprehensive examination of all routes is very inefficient, and would be on devices of limited processing capability.

As Dijkstra's Algorithm is so inefficient, most routing systems have adapted a modified form of Dijkstra's algorithm referred to as the A* (pronounced A Star) Algorithm. In short, an A* Algorithm makes a "guess" as to which edges should be examined first, and which should be delayed, if examined at all. Depending on the quality of the "guess," the A* Algorithm can greatly improve the efficiency of route determination. FIG. 4 is a pictorial diagram illustrating the exemplary map 100, and further illustrating how a typical A* Algorithm expands from an origin, such as Point A 102, to a destination, in this case Point B 104. Those edges and nodes within the ellipse 106, represent those that would likely be examined during the A* best route selection processes, and the internal lines indicate how the route selection expands from Point A 102 to Point B 104.

Those skilled in the art will appreciate that there are numerous algorithms for "guessing" in an A* Algorithmic selection, and an implementor is free to choose any one. For example, in an actual implementation, the "guess" is made according to a distance from a vector 510 extending through an origin, such as Point A 102, and a destination, such as Point B 10, as well as the distance of a node from the vector. For example, FIG. 5 is a pictorial diagram illustrating the exemplary map 100 of FIG. 1, and for illustrating the computation of the guess to determine if an edge should be evaluated during an A* Algorithmic selection. In particular, assuming that the "guessing" algorithm has traversed to both nodes 504 and 506, and then determines which route to further explore, an evaluation according to the predetermined guessing algorithm is made. In this case, the distance between node 504 and where it intersects 502 in a perpendicular manner with the vector 510 is added to the distance between the intersection 502 and the destination, Point B 104. The distance between node 506 and its intersection 508, is added to the distance from intersection 508 to the destination, Point B 104. These values are then used to weight the costs from nodes 504 and 508. These weighted costs are then used by the base double bucket algorithm, as set forth in Dijkstra's algorithm, to determine which route to pursue.

One of the advantages of the "guess" described above, i.e., based on the vector running through the origin to the destination, is that when the route data is sectioned into grids, such as will be described below in regard to the present invention, the selection algorithm tends to favor those routes that lie along the vector, generally narrowing the width of the overall route selection/evaluation. This also tends to minimize the number of grids that the selection algorithm must load during the route selection.

As indicated above, another issue associated with Dijkstra's Algorithm is that many devices upon which route selection is performed is of limited processing abilities. It is simply impracticable for many of the devices to evaluate all routes, then select the best. Even still, many of these devices cannot hold all information (particularly route information) between an origin and destination, at least in memory.

In light of the information above, what is needed are routing devices that implement efficient routing algorithms as well as make efficient use of the routing information in memory. The present invention addresses these and other issues associated with routing/navigation.

SUMMARY OF THE INVENTION

According to aspects of the present invention, a routing system for efficiently providing routing information for a route between an origin to a destination is presented. The routing system comprises a processor and a memory. The memory is used by the processor in determining a route between the origin and destination. The routing system also comprises a storage. The storage contains route data. Route data describes available routes using edges and nodes. Each edge is associated with a cost for traversing, and each node is associated with connections to other edges. The route data is organized according to rectangular grids aligned according to latitudinal and longitudinal increments. The route data is further organized in a hierarchical manner such that the lowest level grids contain all route information falling within each lowest level grid. Higher level grids correspond to at least one lower level grid, and contain a copy of route data from its corresponding lower level grids for those routes that are previously identified as important routes.

According to additional aspects of the present invention, a computer-readable medium bearing route data, is presented. The route data comprises a plurality of edges, where each edge identifies a route segment. Each edge is associated with a cost for traversing that edge. The route data also comprises a plurality of nodes, where each node identifies connections between at least two edges. The route data is organized into sections according to grids, where each grid is represents a defined area according to latitudinal and longitudinal increments. The route data is further organized in a hierarchical manner of grids, where higher level grids correspond to at least one lower level grid. The lowest level grids contain route data for all available routes, and a higher level grid contains a copy of the route data from its corresponding lower lever for only those routes in the lower level grids that are identified as important routes According to still further aspects of the present invention, a computer-readable medium bearing computer-executable instructions which, when executed on a routing device carry out a method for efficiently determining a route between an origin and destination. The route data includes a plurality of edges identifying a portion of an available route with costs associated with each of the plurality of edges. The route data is organized into sections according to grids, where each grid is defined according to latitudinal and longitudinal increments. The grids are further organize in a hierarchical manner such that a higher level grid corresponds to at least one lower level grid, and where the lowest level grids contain the route data for all of the available routes. Each higher level grid contains a duplicate of the route data from its corresponding lower level grids for only those routes in the lower level grids that are identified as important routes. In operation, the method comprises establishing an open list and a closed list. All edges, reachable from the origin, with their traversal costs, are added onto the open list. Thereafter the following are repeatedly executed until a route to the destination is determined or until the open list is emptied. The lowest cost edge, referred to as Edge A, is selected from the open list. Edge A is placed on the closed list with the associated cost of traversing all previous route segments up to and including the traversal of Edge A. For each edge reachable from the end of Edge A (each referred to as Edge B), the cost to traverse from the end of Edge B to the destination is determined. A determination as to whether Edge B corresponds to another edge in a higher grid (referred to as Edge C) is made, and if so, Edge B is added to the open list with its total traversal cost plus an inflated value and Edge C is added to the open list with the total traversal cost of Edge B. A determination is also made as to whether Edge B corresponds to another edge in a lower grid (referred to as Edge D) is made. If so, Edge B is added to the open list with its total traversal cost, and Edge D is added to the open list with the total traversal cost of Edge B plus an inflated value.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a pictorial diagram illustrating the exemplary map of FIG. 1 divided into larger sections, or grids, for storage on a exemplary routine device, according to aspects of the present invention.

DETAILED DESCRIPTION

As mentioned above, the typical computing device, or routing device, implementing the present invention may not always have large amounts of dynamic memory suitable for use by a processor in selecting a route from route information. On the other hand, it is anticipated that the routing device would include an amount of storage for storing the routing information, although a routing device may rely upon obtaining routing information from an external source, such as via a wireless connection.

Figure 6:
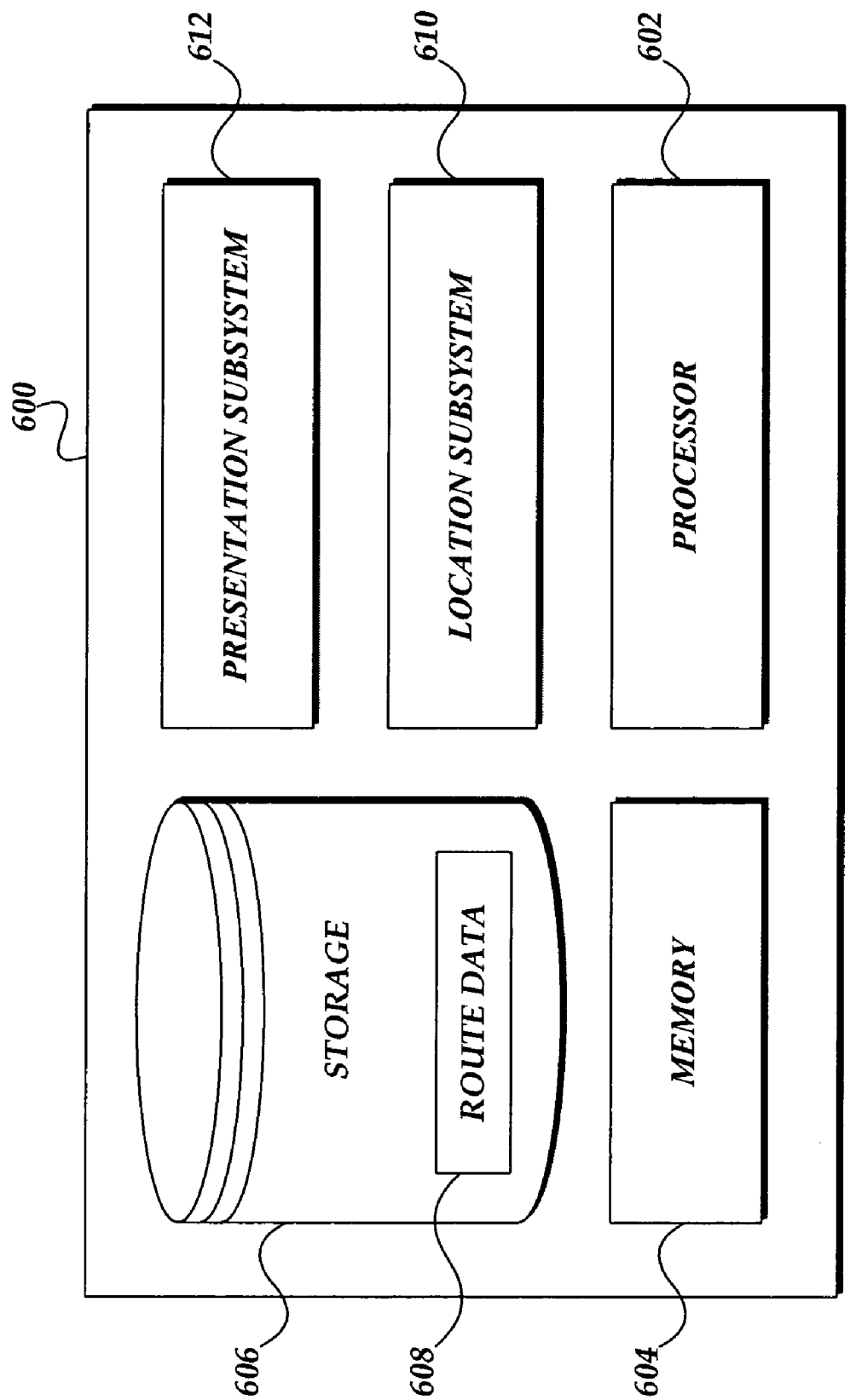
FIG. 6 is a block diagram illustrating components of a exemplary routing device suitable for implementing aspects of the present invention.

FIG. 6 is a block diagram illustrating components of a exemplary routing device 600 suitable for implementing aspects of the present invention. The exemplary routine device 600 includes a processor 602, a memory 604, and a storage 606. As indicated above, the processor 602 uses the memory 604, to identify/select a route from an origin to a destination. In this example, storage 606 includes route data 608 that the processor 602 uses to select a particular route.

The exemplary routing device 600 may also include an optional location subsystem 610. The location subsystem 610 would provide the routing device 600 specific location information, such as the current location of the routing device 600 which is often used as the origin in determining a route to a destination. Additionally, quite often the location subsystem 610 is also used to determine the location of an origin or destination, or perhaps for translating information regarding the origin or destination into a location suitable for use by the routing device to select a route. For example, a destination my frequently be provided in terms of an address, such as "715 S Main Street." The route data 608 will typically need destination information in terms of latitudinal and longitudinal coordinates. The location subsystem 610 is used to convert the address to the geophysical coordinates. As an alternative to converting addresses or other user input information into geophysical coordinates, the location subsystem 610 could be a communication conduit to an external service or system that provides the necessary geophysical coordinates for the routing device 600 to select a route.

The exemplary routing device 600 is further illustrated as including a presentation subsystem 612. The presentation subsystem 612 is used to present the selected route to a user. In one embodiment, the presentation subsystem 612 is a display device included in the routing device 600 that displays the route to the user as a highlighted route on a graphic map display. Alternatively, the presentation subsystem 612 present the selected route as a series of driving directions to a user. The presentation subsystem 612 could also operate in conjunction with the location subsystem 610 in order to provide real-time, location specific directions according to a selected route. Still further, the presentation subsystem 612 may be a conduit by which a selected route is reported to another external system and/or device.

While the exemplary routing device 600 is presented above as a specific use device, it should be appreciated that it is only one embodiment, and should not be construed as limiting upon the present invention. In fact, aspects of the present invention may be implemented on any number of computing devices, including personal computers, server computers and/or services, hand-held personal digital assistants (PDAs), hybrid hand-held devices such as wireless phones/PDAs, and the like. Additionally, while the exemplary routing device 600 presents various components as discrete components, it should be appreciated that the identified components are logical components, and may be configured with any number of actual components.

Figure 2:
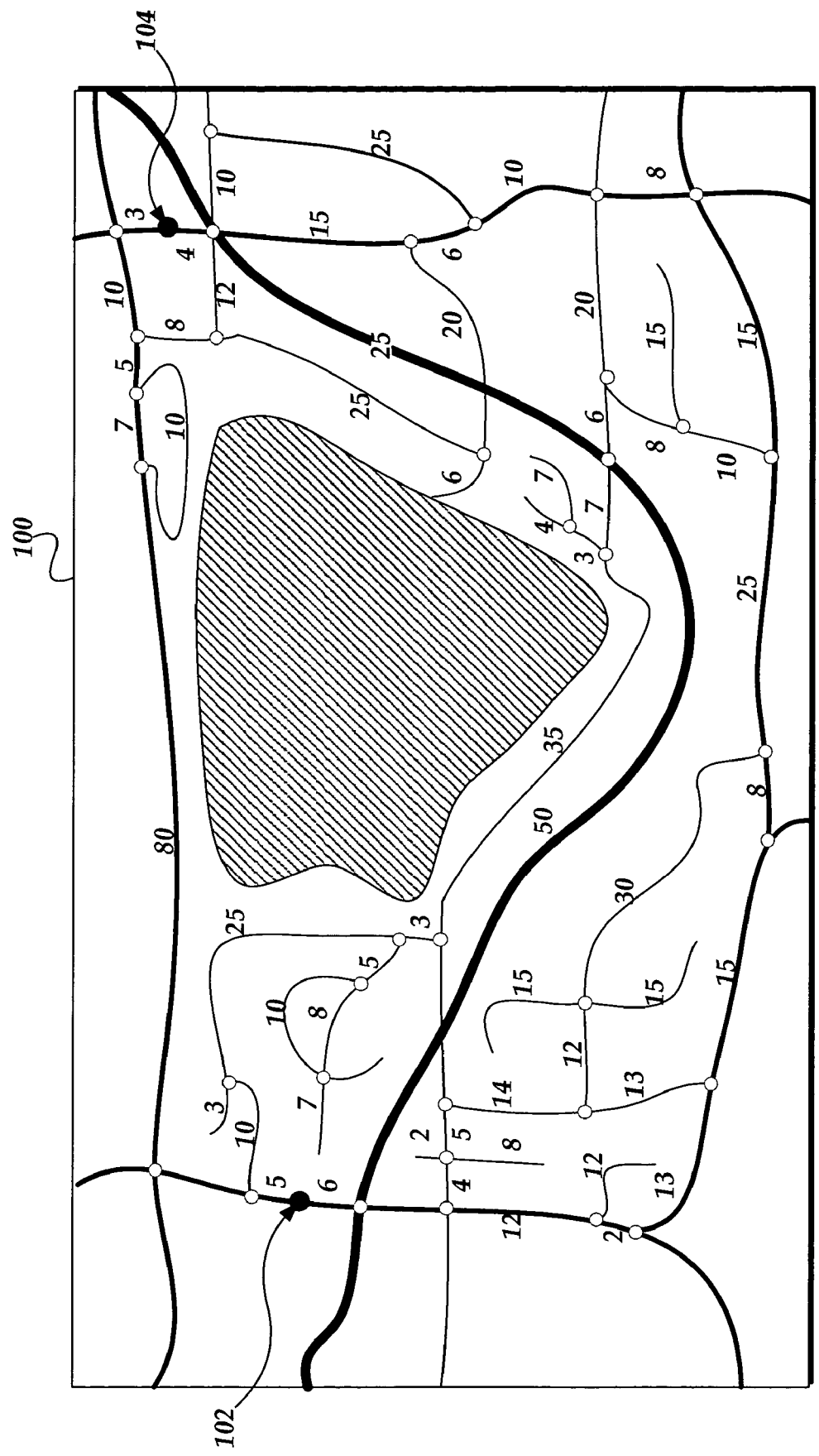
FIG. 2 illustrates the exemplary map of FIG. 1 with exemplary nodes, edges, and costs associated with traversing those edges.
Figure 3:
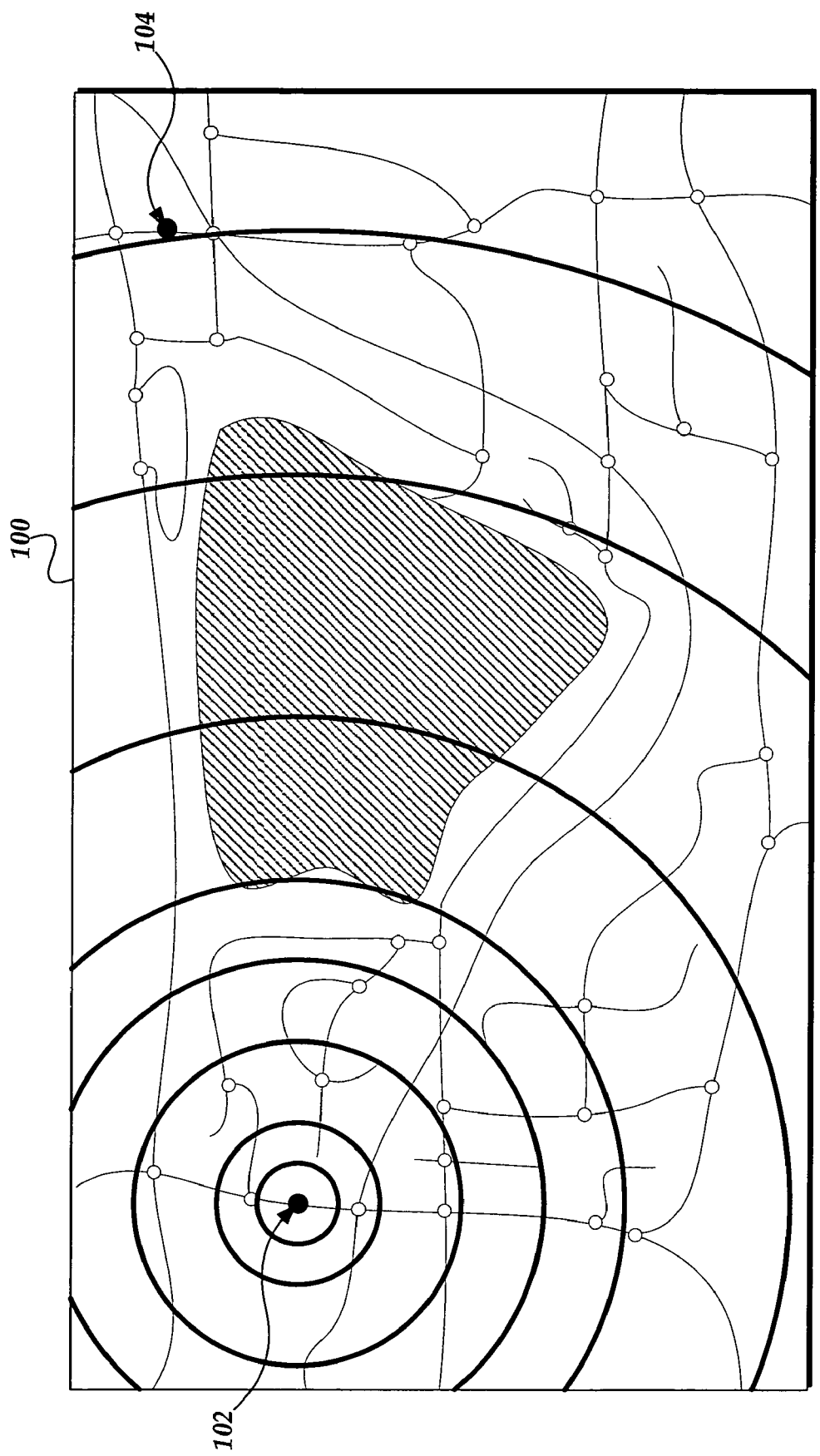
FIG. 3 shows the exemplary map of FIG. 1 and is used for illustrating how Dijkstra's Algorithm expands in all directions to determine the best route between an origin and destination.
Figure 4:
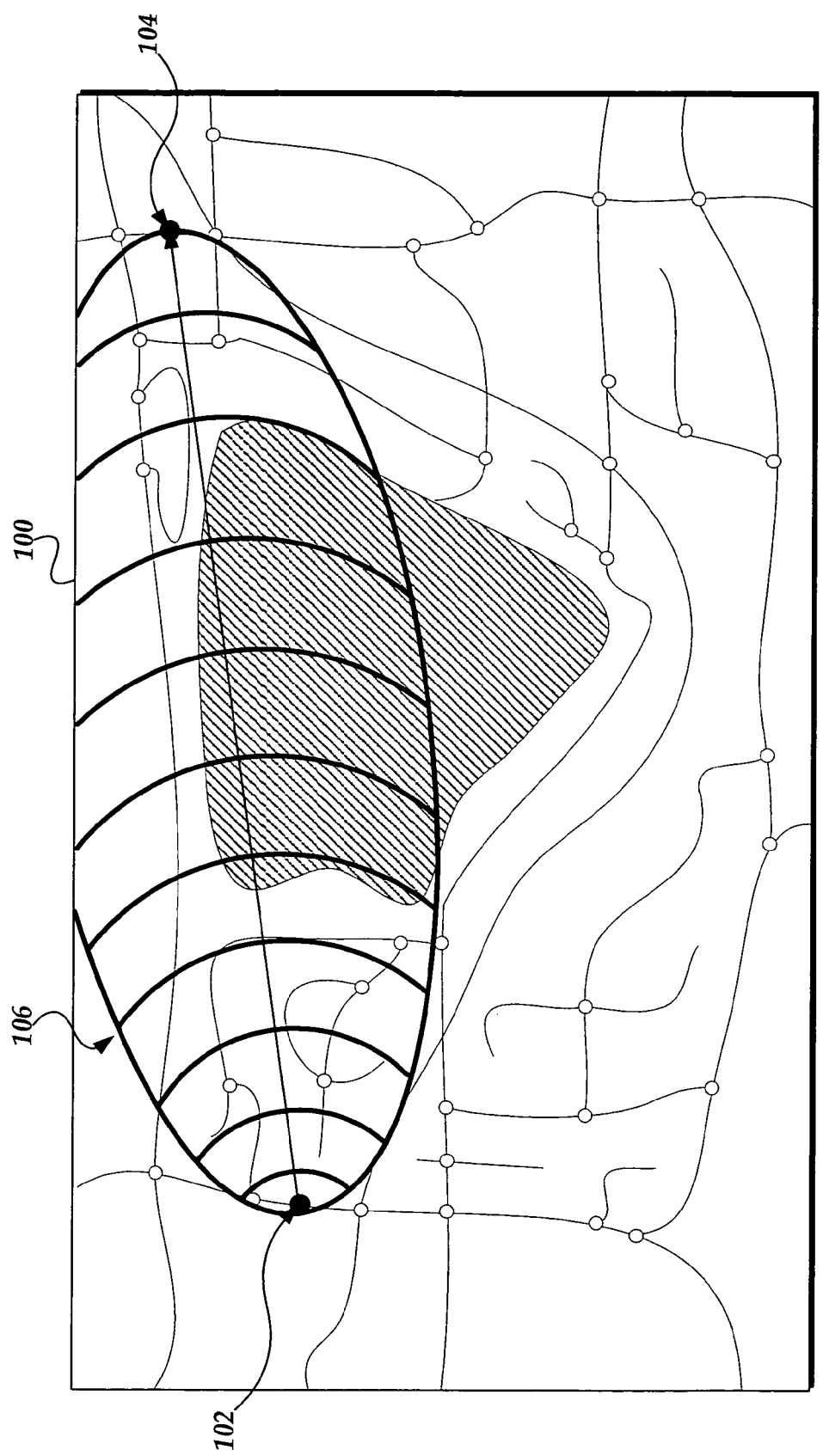
FIG. 4 is a pictorial diagram illustrating the exemplary map of FIG. 1, and further illustrating how a typical A* Algorithm expands from an origin to a destination.

With regard to the route data 608, those skilled in the art will readily appreciate that such information, especially when it includes edges with traversal costs and nodes/connection points (i.e., as described above in regard to FIG. 2), can involve a substantial amount of data and, correspondingly, require a substantial amount of storage space. Almost always, the route data far outstrips the amount of memory 604 that the processor 602 uses to determine a route from an origin to a destination. Thus, according to aspects of the present invention, a novel storage approach is presented that enables the routing device 600 to efficiently determine a route.

According to aspects of the present invention, the route data 608 is organized into grids. According to one embodiment of the invention, grids are aligned with certain increments in latitude and longitude. By organizing the grids along increments in latitude and longitude, a specific grid (of route data) that corresponds to a particular location can be easily determined and then retrieved.

Figure 1:
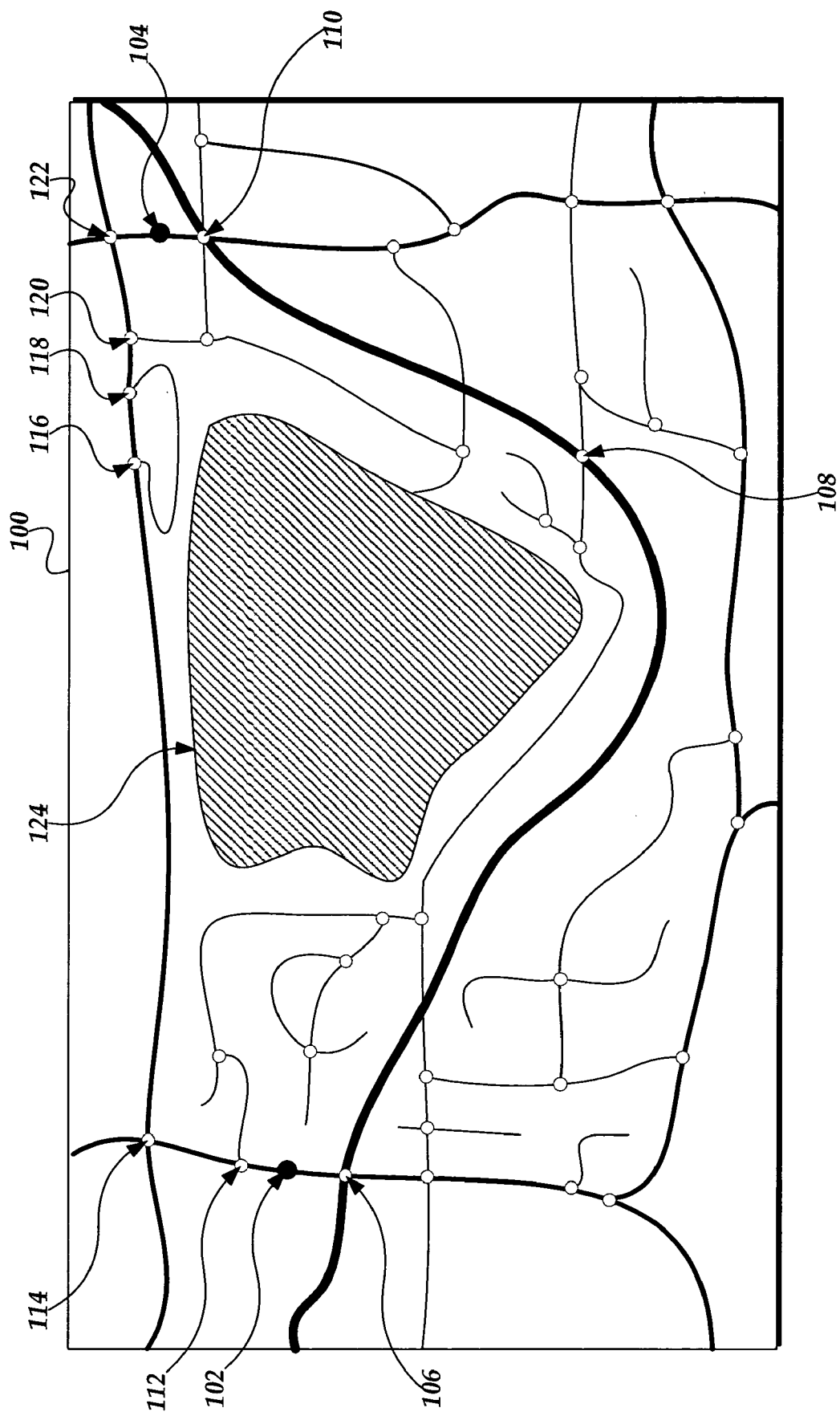
FIG. 1 is an exemplary map useful for illustrating aspects of the present invention.
Figure 7:
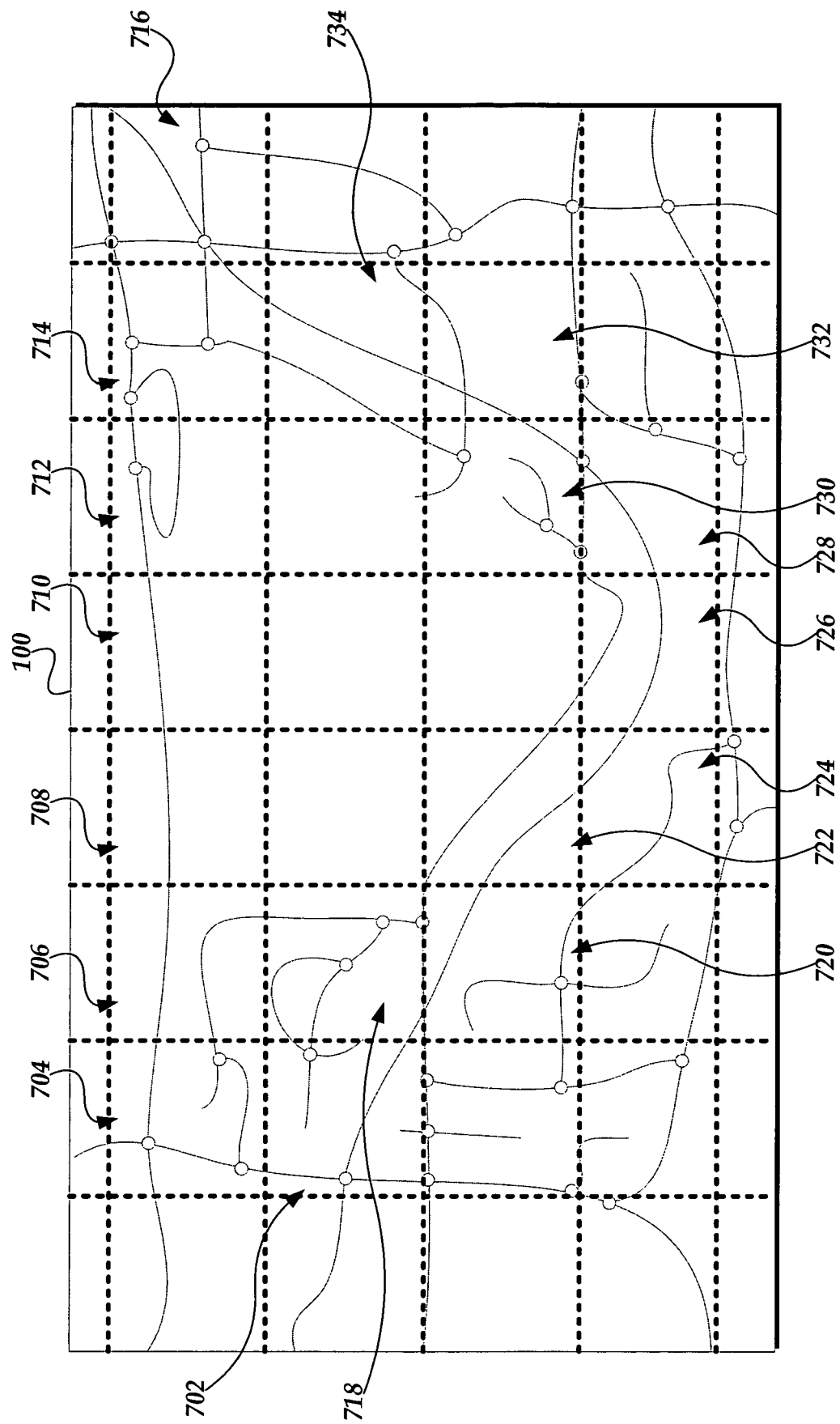
FIG. 7 illustrates the exemplary map of FIG. 1 divided into sections, or grids, for storage on an exemplary routing device according to aspects of the present invention.

FIG. 7 is a pictorial diagram illustrating the exemplary map 100 of FIG. 1 divided into sections, or grids, for storage on a routing device 600, according to aspects of the present invention. As can be seen, each portion of the route data 608 falls within a grid. For example, Point A 102 (of FIG. 1) falls into grid 702. Additionally, the route that extends from node 106 to node 108, and from node 108 to node 110 (FIG. 1), hereafter referred to as "Route A", falls into numerous grids, including grids 702, 718, 720, 722, 724, 726, 728, 730, 732, 734, and 716. Similarly, the route that traverses nodes 112, 114, 116, 118, 120, and 122, hereafter referred to as "Route B", falls into grids 704, 706, 708, 710, 712, 714, and 716.

As these two routes, Route A and Route B, illustrate, when route data 608 is organized into grids, a route between an origin and destination frequently require that more than one grid of information be examined. Unfortunately, retrieving and/or swapping grids from memory and storage is can be extremely inefficient. Additionally, in many circumstances, an individual grid (i.e., a section of route data) may include a substantial number of possible routes that can be traversed between an origin and destination. However, in many cases, most "best" routes from an origin to a destination typically include major thoroughfares. Additionally, once a person is traveling on a major thoroughfare, such as a freeway, it is very unlikely that the person will exit the thoroughfare onto local city streets if that person is just passing through to another location. For these reasons, and others, according to aspects of the present invention, the route data 608 is organized according to a hierarchy of grids.

The lowest level of grids includes all route data for the area covered by the grid. At each level up in the hierarchy is another layer of grids. Additionally, each level up in a grid corresponds to a plurality of lower level grids. For example, FIG. 8 is a pictorial diagram illustrating the exemplary map 100 of FIG. 1 divided into larger sections, or grids, for storage on an exemplary routing device 600, according to aspects of the present invention. In an actual embodiment, each higher level grid corresponds to 4 lower level grids. Thus, lower level grids 702 and 704 correspond to higher level grid 802, while lower level grids 706 and 708 correspond to higher level grid 804.

While the lowest level grids contain all route data available for that grid, according to the present invention, only route data for "important" routes on that grid are included. More particularly, assuming that Route A and Route B (from the example above) are deemed to be "important" routes, then the edges and nodes that make up those routes would be included in the corresponding higher level grids. For example, the edges, and their costs, along Route B (that includes nodes 112, 114, 116, 118, 120, and 122) are included in the corresponding higher level grids. Similarly, nodes and edges for Route A (including edges and their costs between nodes 106, 108, and 110) are also included in the corresponding higher level grids. However, route information for other routes not deemed "important", found in the lowest level grids, is not included in the higher level grid.

Because each high level grid contains a duplicate of only "important" route information as found in the lower level grids, storage requirements for each higher level grid may be substantially smaller than lower level grids, even though they correspond to more physical area. In fact, in many instances, the storage requirements of a higher level grid is an order of magnitude smaller than the corresponding lower level grids. Additionally, due to the organization of the hierarchy of grids, the routing device 600 is able to quickly move up and down in levels.

Clearly, one of the advantages of higher level grids is that fewer grids must be retrieved when the route crosses grid boundaries. As indicated above in regard to FIG. 7, on just the lowest level grids, Route A spanned 12 lowest level grids and Route B spanned 8. Thus, with just the lowest level, determining a best route between Point A 102 and Point B 104 would require numerous retrievals/exchanges of route data 608. Thus, on the lowest level, Route A alone would require at least 12 retrievals of information. In contrast, if only the "important" routes were examined at the higher level grids, and assuming that Point A 102 and Point B 104 were part of the "important" routes, both Route A and Route B would require about half of the retrievals/exchanges. This, coupled with the fact that the higher level grids are generally substantially smaller, improves retrievals and data exchanges, thereby improving the overall performance of the system.

Clearly, not all origins and destinations will reside on the "important" routes. Hence, a combination of lower level and higher level grids must be used, resorting to higher level grids whenever possible. In order to do this, the A* algorithm for determining a route from the origin to the destination must adapt to consider multiple levels of information. FIGS. 9A-9D illustrate a flow diagram of an exemplary routine 900 for selecting a route between an origin and destination, including multiple levels of grid information, according to aspects of the present invention.

Beginning at block 902, consistent with A* and Dijkstra's algorithms, all edges (along with certain information including traversal cost) leading for the origin are added to an open list. At decision block 904, a determination is as to whether the open list is empty, i.e., whether there are or are not more edges to examine. If there are no more edges on the open list to examine, at terminal 906 the routine 900 returns a response that there is no route between the origin and destination and then terminates.

If there are edges on the open list, at block 908, the exemplary routine 900 selects the lowest cost edge on the open list. In this description of FIG. 9, this selected edge is referred to as Edge "A". At decision block 910, a determination is made as to whether the Edge "A" terminates at the specified destination. If traversal of Edge "A" terminates at the specified destination, at terminal 912, a route between the origin and destination was found and routine 900 returns the route that was found.

If Edge "A" did not terminate at the specified destination, at decision block 914, a determination is made as to whether the cost associated with Edge "A" is very high, i.e., is the cost already unreasonably high. If the cost is very high, at terminal 916, the routine 900 returns a response that no practical route was found, and the routine terminates.

If the cost associated with Edge "A" is not unreasonable, at block 918, Edge "A" is placed on a closed list, indicating that the algorithm has visited this edge, along with its current cost, i.e., the cost of getting to and traversing to the end of Edge "A".

At control block 920 (FIG. 9B), a "for" loop is commenced. As those skilled in the art will appreciate, a "for" loop performs a set of operations for each of a set of options. In this case, the "for" loop iteratively performs a set of operations for each edge reachable from the end of Edge "A". As indicated in control block 920, and as will be appreciated by those skilled in the art, for each iteration, the currently selected edge reachable from the end of Edge "A" will be referred to generically as Edge "B".

At block 922, the current cost to traverse to the Edge "B", which includes the previous costs to arrive at Edge B, is determined. At decision block 924, a determination is made as to whether Edge "B" is already on the closed list, meaning that Edge "B" has already be visited. If Edge "B" is on the closed list, at decision block 926, a further determination is made as to whether the current cost determined at block 922 is smaller than the cost stored with Edge "B" on the closed list. In other words, a determination is made as to whether a less costly route has been identified that arrives at Edge "B". If the recently determined current cost is smaller than the cost associated with Edge "B" on the closed list, at block 928, Edge "B" is removed from the closed list. Alternatively, if the current cost is not less than the cost stored with Edge "B" on the closed list, the routine 900 proceeds to end control block 946 (FIG. 9D) corresponding to the end of the "for" loop commenced in control block 920.

Figure 5:
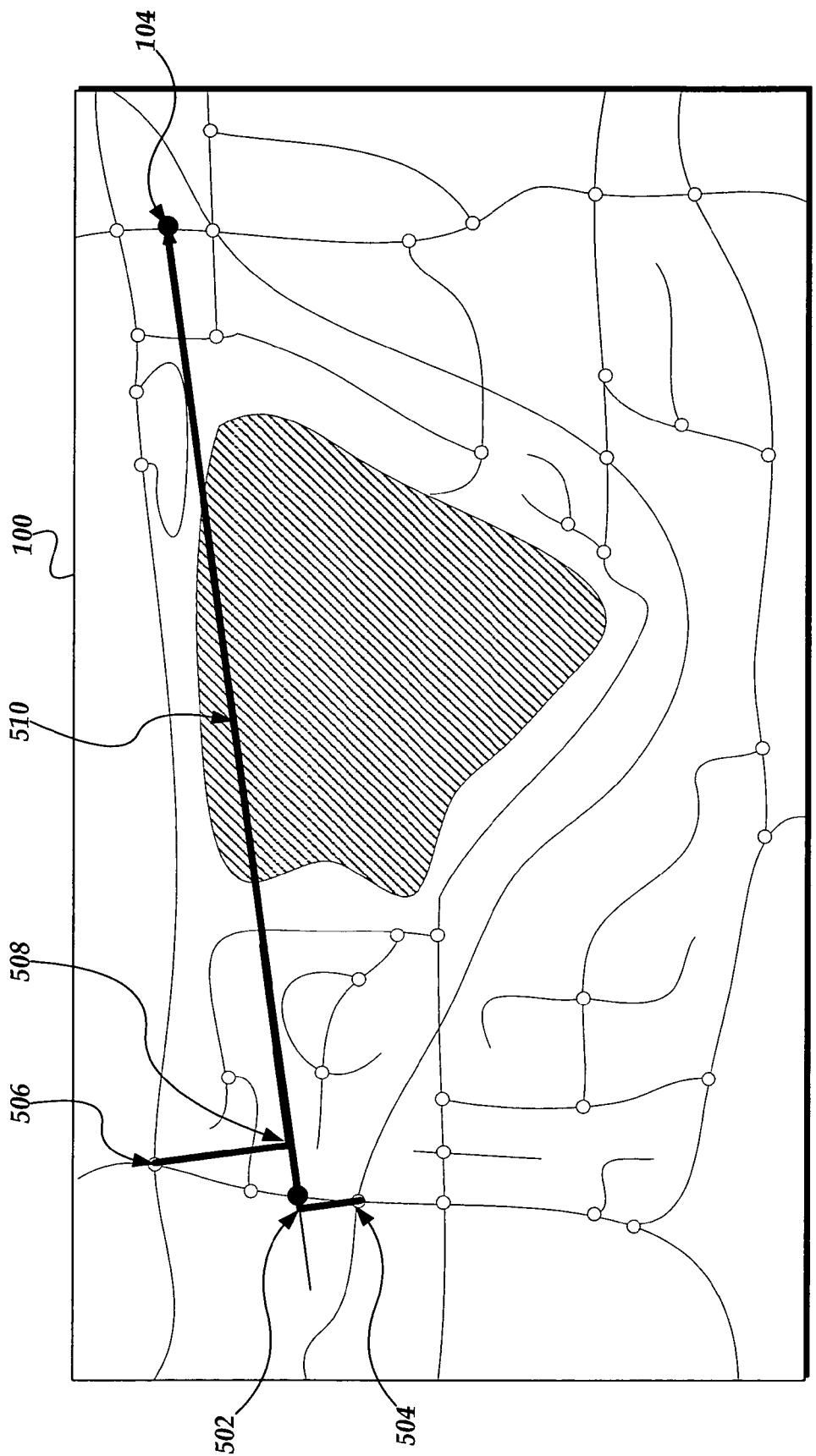
FIG. 5 is a pictorial diagram illustrating the exemplary map of FIG. 1, and for illustrating the computation of the A* guess to determine if an edge should be next evaluated in route selection.
Figure 9A:
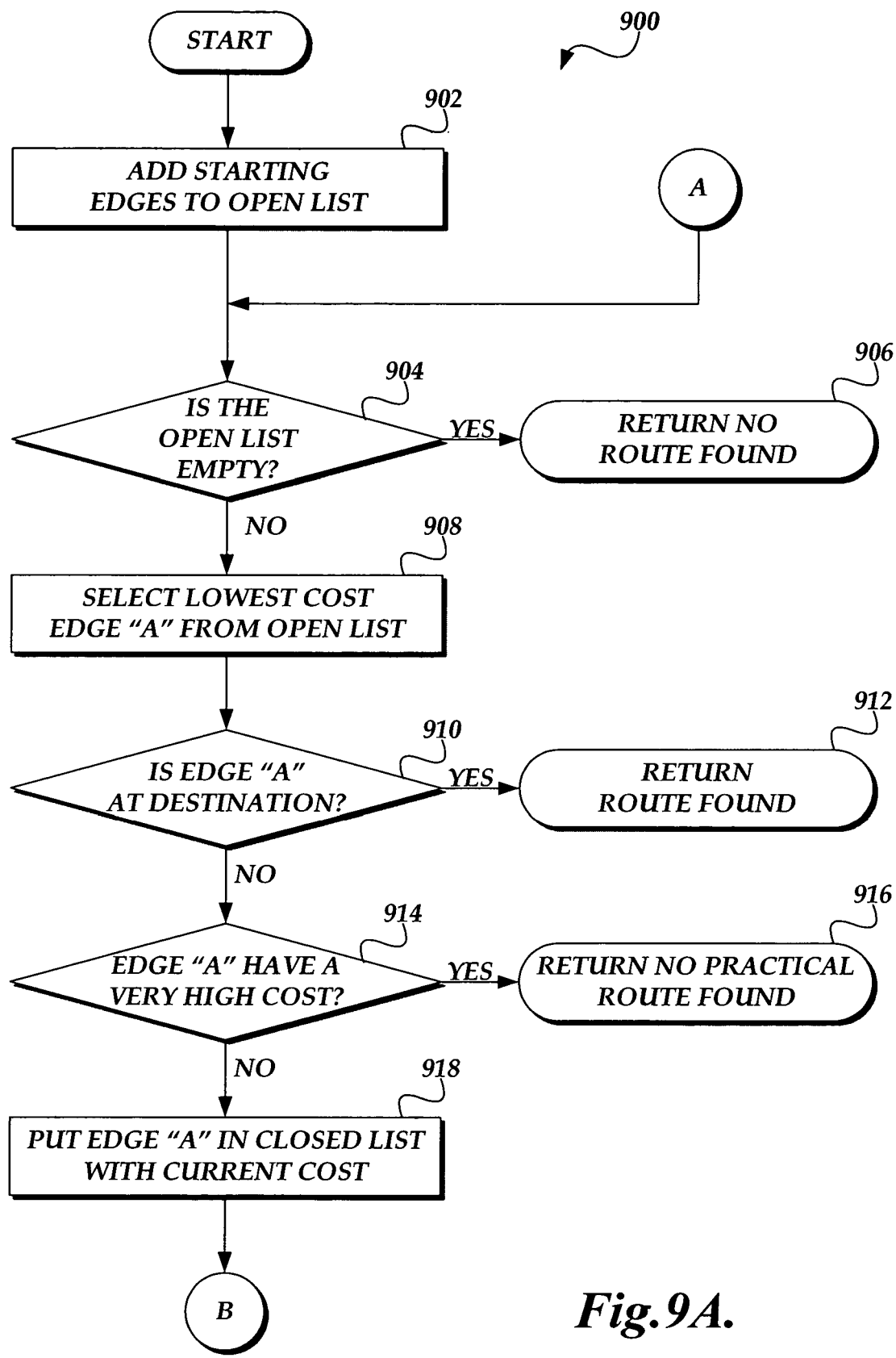
FIGS. 9A-9D illustrate a flow diagram of an exemplary routine for selecting a route between an origin and destination according to aspects of the present invention.
Figure 9B:
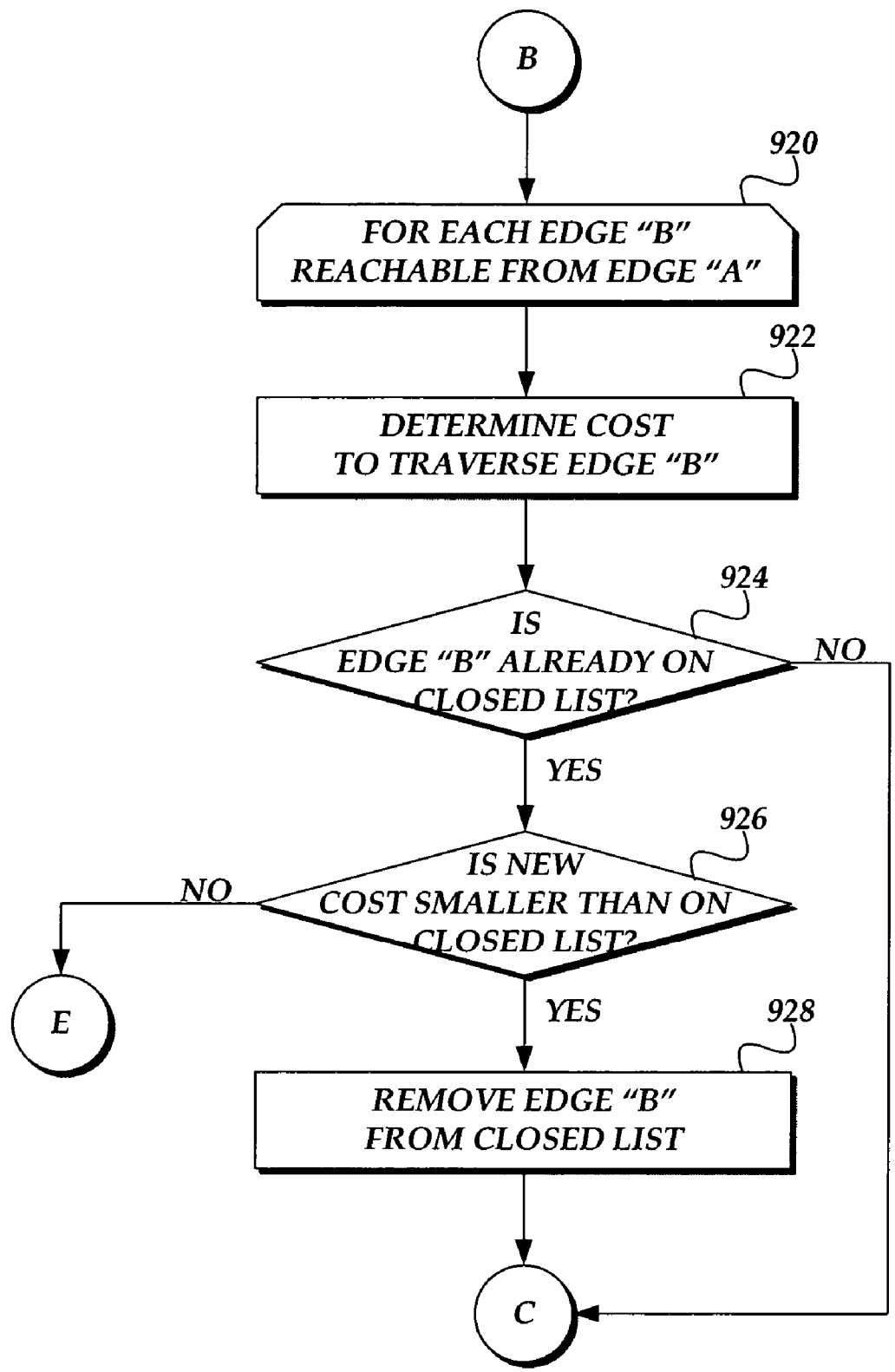
Figure 9C:
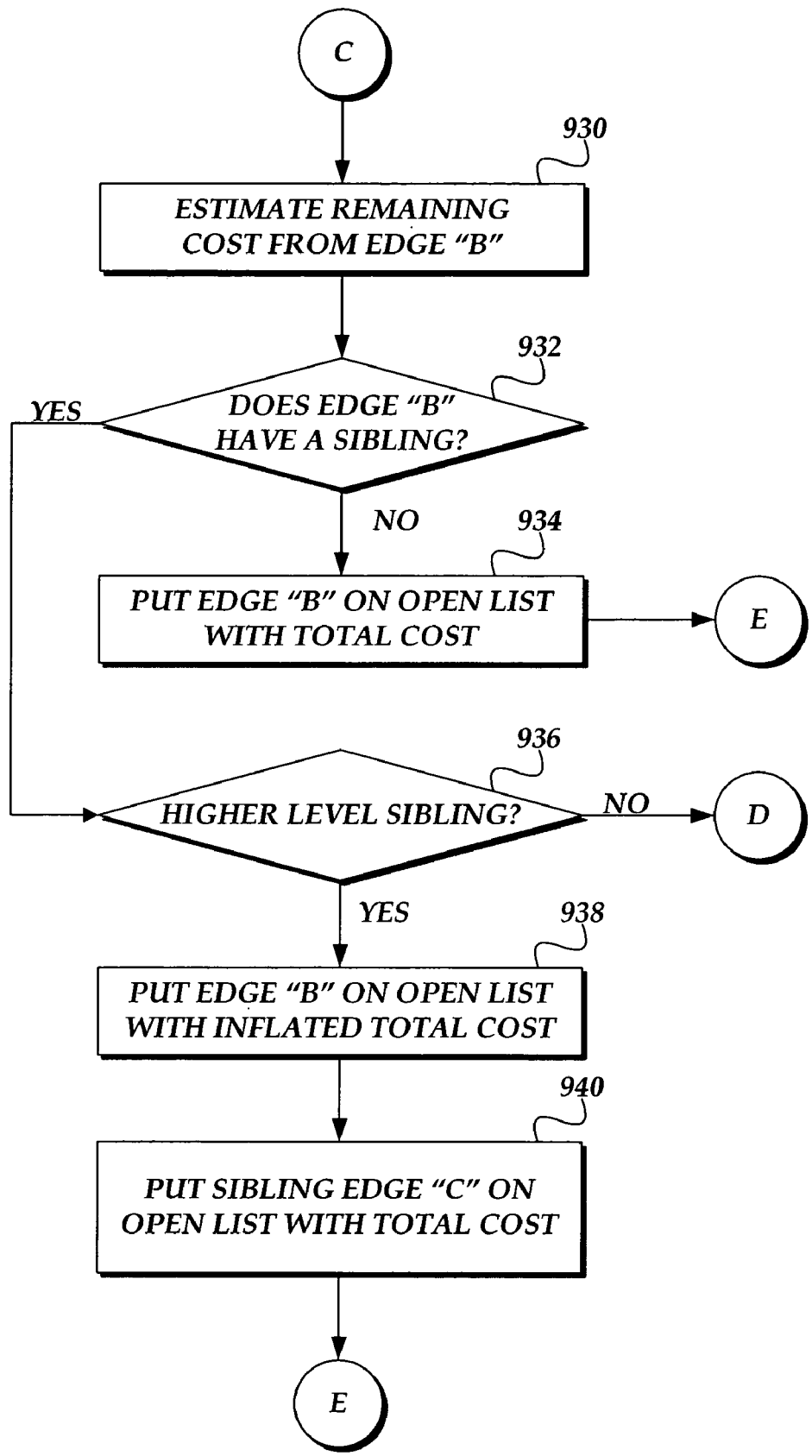
Figure 9D:
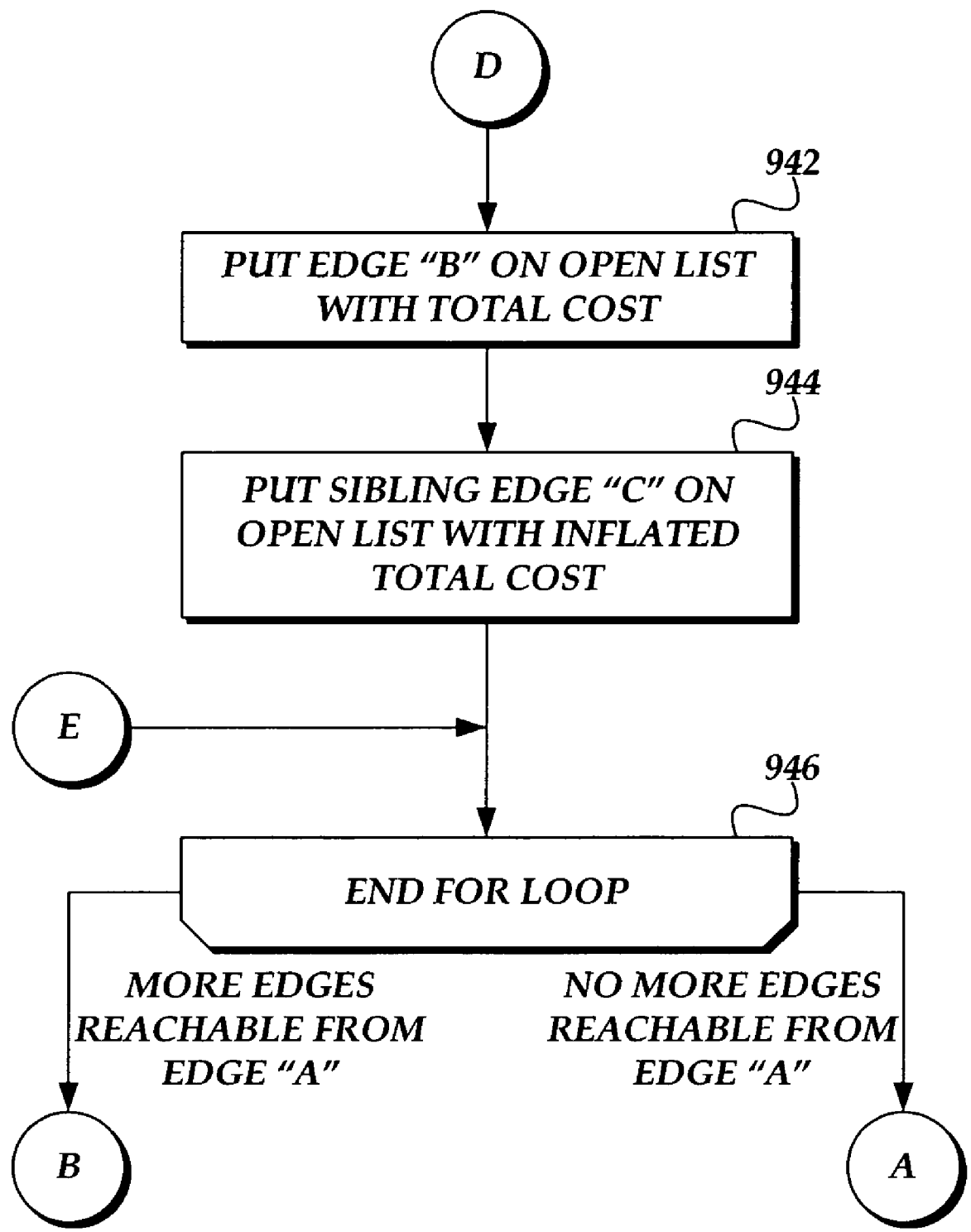

At block 930 (FIG. 9C), an estimate as to the remaining cost, i.e., the cost to traverse from the end of Edge "B" to the destination, is made. In one embodiment, this estimate is made according to the "guess" as described above in regard to FIG. 5. At decision block 932, another determination is made as to whether Edge "B" has a corresponding edge, referred to hereafter as a sibling, either in a higher level grid or a lower level grid. If Edge "B" does not have a sibling, at block 934, Edge "B" is placed on the open list with its total cost, i.e., the sum of the previous current cost of Edge "B" plus the estimated remaining cost (total cost("B")=old cost("B")+estimate). After placing Edge "B" on the open list, with its new total cost, the routine 900 proceeds to end control block 946 (FIG. 9D).

If, at decision block 932, it is determined that Edge "B" has a sibling either in a higher level grid or a lower level grid, referred to hereafter generically as sibling Edge "C", the routine 900 proceeds to decision block 936. At decision block 936, a determination is made as to whether sibling Edge "C" is a higher level sibling, i.e., whether sibling Edge "C" is in a higher level grid. If sibling Edge "C" is a higher level sibling, at block 938, Edge "B" is placed on the open list with an inflated total cost (total cost ("B")=old cost("B")+estimate+inflation value). After placing Edge "B" on the open list with an inflated cost, at block 940, sibling Edge "C" is placed on the open list with the total cost of Edge "B" but without the inflation value (total cost ("C")=old cost ("B")+estimate). Thereafter, the routine 900 proceeds to control block 946 (FIG. 9D) corresponding to the end of the "for" loop commenced in control block 920

By inflating the cost on the open list of the lower level sibling, Edge "B" over the cost of sibling Edge "C", the selection portion (block 908 of FIG. 9A) of this routine 900 favors staying with routes/edges that are located in the higher level grids. Additionally, according to one embodiment of the present invention, the inflation value is determined as a function of the distance from the end of the current edge to the destination. In this manner, edges in higher levels are more favored more when the distance is great, as they have a substantially lower cost than corresponding edges in lower level grids, and favored less as they near the destination. By remaining as long as possible in higher level grids, fewer alternative and typically less important edges are explored, fewer retrievals and exchanges of information are made, and the routing device 600 operates more efficiently.

If, at decision block 936, it is determined that Edge "C" is a lower level sibling, at block 942 (FIG. 9D), Edge "B" is placed on the open list with its total cost (total cost ("B")=old cost("B")+estimate). At block 944, sibling Edge "C" is placed on the open list with an inflated cost of Edge "B" (total cost ("B")=old cost("B")+estimate+inflation value), thereby ensuring that the higher level edge will be favored and explored first.

At end control block 946, which corresponds to the end of the "for" loop, the routine 900 either returns again to the start of the "for" loop at control block 920 (FIG. 9B), or returns to decision block 904 to continue with selecting new edges from the open list. Thus, if there are more edges reachable from Edge "A", the routine 900 returns to control block 920. Alternatively, if there are no more edges reachable from Edge "A", the routine 900 proceeds to decision block 904 to begin selecting a new Edge "A" to further explore.

As those skilled in the art will appreciate, the routine 900 continues until a route is found (as determined in decision block 910), until it is determined that a route is not available (as determined in decision block 904), or until it is determined that if there is a route, its cost is so unreasonable as to not be considered a practical route (as discussed in regard to decision block 914).

While the above description of the exemplary routine 900 discuss an embodiment of only two levels of grids that include route data 608, or in other words, that the hierarchy of route data 608 includes only two levels, it is for illustration purposes and ease of description only, and should not be construed as limiting upon the present invention. In alternative embodiments, the route data 608 may include more than two levels of data.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A routing system for efficiently providing routing information for a route between an origin and destination, the routing system comprising:
   a processor;
   a memory for use by the processor in determining a route between the origin and destination; and
   a storage containing route data, wherein the route data describes available routes using edges and nodes, each edge associated with a cost and one or more cost inflation values associated with one or more siblings for each edge, and each node associated with connections to other edges, wherein the route data is organized according to rectangular grids aligned according to latitudinal and longitudinal increments, and wherein the route data is further organized in a hierarchical manner such that the lowest level grids contain all route information falling within the area defined by each lowest level grid, and higher level grids correspond to at least one lower level grid and contain a copy of route data from the corresponding lower level grids for those routes that are identified as important routes.

2. The routing system of claim 1, wherein the routing system is configured to provide routing information between the origin and destination according to an A* Algorithm.

3. The routing system of claim 2, wherein the A* Algorithm of the routing system is configured to estimate the remaining cost from the end of an edge to the destination according to the distance from the end of the edge along a line to the intersection with a vector that runs through the origin to the destination, plus the distance between the intersection of the line and the vector and the destination, wherein the line is perpendicular to the vector.

4. The routing system of claim 3, wherein the routing system is an integrated device suitable for use within a user-navigable vehicle.

5. The routing system of claim 3, wherein the routing system is a remote routing and navigation service for providing routing and navigation information in response to a route request.

6. The routing system of claim 1, wherein the routing system is configured to provide routing information between the origin and destination by:
   establishing an open list and a closed list in the memory;
   adding all edges reachable from the origin onto the open list with their costs; and
   repeatedly:
      selecting the lowest cost edge, referred to as Edge A, from the open list;
      putting Edge A onto the closed list with the cost of traversing to the end of Edge A; and
      for each edge, referred to as Edge B, reachable from the end of Edge A:
         estimating a total cost to traverse from the end of Edge B to the destination;
         determining whether Edge B corresponds to an edge, referred to as Edge C, in a higher grid, and if so, adding Edge B to the open list with the estimated total cost plus an inflated value, and adding Edge C to the open list with the estimated total cost; and
         determining whether Edge B corresponds to an edge, referred to as Edge D, in a lower grid, and if so, adding Edge B to the open list with the estimated total cost, and adding Edge D to the open list with the estimated total cost plus an inflated value;
      until a route to the destination is determined or until the open list is emptied.

7. The routing system of claim 6, wherein upon selecting the lowest cost edge from the open list, determines whether the current cost of the lowest cost edge exceeds a predetermined threshold, and if so, terminates the search for a route between the origin and the destination, and provides an error report that no reasonable route exists between the origin and the destination.

8. The routing system of claim 6, wherein upon encountering the condition where the open list is emptied, provides an error report that no route exists between the origin and the destination.

9. A computer-readable medium bearing route data for use by a routing system, wherein the route data comprises:
   a plurality of edges, each edge identifying a route segment;
   for each of the plurality of edges a cost associated with traversing that edge and one or more cost inflation values associated with one or more siblings for each of the plurality of edges;
   a plurality of nodes, wherein each node identifies connections between at least two edges;
   wherein the route data is organized in sections according to grids, wherein each grid corresponds to a geographic area defined according to latitudinal and longitudinal increments, wherein each grid comprises route data for routes that lie within the corresponding geographic area;
   and wherein the route data is further organized in a hierarchical manner of grids where each higher level grid corresponds to at least one lower level grid, and wherein the lowest level grids contain the route data for all of the available routes lying within their corresponding geographic areas, and each higher level grid contains a duplicate of the route data from its corresponding lower level grids for only those routes in the lower level grids that are identified as important routes.

10. The computer-readable medium of claim 9, wherein the routing system is an integrated navigation device suitable for use in a navigable vehicle for providing navigation and routing information to a user.

11. The computer-readable medium of claim 9, wherein the routing system is a remote routing system that provides navigation and routing information in response to a route request.

12. A computer-readable medium bearing computer-executable instructions which, when executed on a routing device including route data, the route data including a plurality of edges identifying a portion of an available route with costs associated with each of the plurality of edges, and where the route data is organized into sections according to grids, where each grid is defined according to latitudinal and longitudinal increments, and where the grids are further organize in a hierarchical manner such that a higher level grid corresponds to at least one lower level grid, and where the lowest level grids contain the route data for all of the available routes and each higher level grid contains a duplicate of the route data from its corresponding lower level grids for only those routes in the lower level grids that are identified as important routes, carry out a method for efficiently determining a route between an origin and destination, the method comprising:

establishing an open list and a closed list;

adding all edges reachable from the origin onto the open list with their costs; and repeatedly:

selecting the lowest cost edge, referred to as Edge A, from the open list;

putting Edge A onto the closed list with the cost of traversing up to and to the end of Edge A; and for each edge, referred to as Edge B, reachable from the end of Edge A:

estimating a total cost to traverse from the end of Edge B to the destination;

determining whether Edge B corresponds to an edge, referred to as Edge C, in a higher grid, and if so, adding Edge B to the open list with the estimated total cost plus an inflated value, and adding Edge C to the open list with the estimated total cost; and determining whether Edge B corresponds to an edge, referred to as Edge D, in a lower grid, and if so, adding Edge B to the open list with the estimated total cost, and adding Edge D to the open list with the estimated total cost plus an inflated value;

until a route to the destination is determined or until the open list is emptied.

13. The method of claim 12, wherein upon selecting the lowest cost edge from the open list, further determines whether the current cost of the lowest cost edge exceeds a predetermined threshold, and if so, terminates the search for a route between the origin and the destination, and provides an error report that no reasonable route exists between the origin and the destination.

14. The method of claim 12, wherein upon encountering the condition where the open list is emptied, further provides an error report that no route exists between the origin and the destination.

* * * * *